United States Patent [19]
Makino et al.

[11] Patent Number: 6,026,549
[45] Date of Patent: Feb. 22, 2000

[54] CRANKPIN PHASE INDEXING METHOD AND APPARATUS

[75] Inventors: Kunio Makino; Takashi Imai; Hiroyuki Uchida; Yukio Kokaji, all of Toyama-ken, Japan

[73] Assignee: Nippon Toyama Corporation, Tokyo-to, Japan

[21] Appl. No.: 08/875,561

[22] PCT Filed: Nov. 8, 1996

[86] PCT No.: PCT/JP96/03292

§ 371 Date: Jul. 25, 1997

§ 102(e) Date: Jul. 25, 1997

[87] PCT Pub. No.: WO97/19784

PCT Pub. Date: Jun. 5, 1997

[30] Foreign Application Priority Data

Nov. 30, 1995 [JP] Japan .................................. 7-338278
Jan. 29, 1996 [JP] Japan .................................. 8-013217

[51] Int. Cl.⁷ .................................................. B23B 7/00
[52] U.S. Cl. ...................... 29/27 R; 29/6.01; 29/888.08; 82/106; 409/131; 409/165; 409/199; 451/399
[58] Field of Search ........................ 409/165, 166, 409/199, 201, 244, 131, 132; 29/6.01, 27 R, 888.08; 82/106; 451/399

[56] References Cited

U.S. PATENT DOCUMENTS

| | | | |
|---|---|---|---|
| 3,006,118 | 10/1961 | Fournier | 451/399 |
| 3,142,941 | 8/1964 | Fournier et al. | 451/399 |
| 3,334,449 | 8/1967 | Price | 451/399 |
| 3,482,356 | 12/1969 | Fournier | 451/399 |
| 3,680,876 | 8/1972 | Okada | 451/399 |
| 4,099,431 | 7/1978 | Kreucher | 409/166 |
| 4,669,223 | 6/1987 | Schwar | 409/165 |
| 5,144,772 | 9/1992 | Kawamata et al. | 409/199 |
| 5,189,846 | 3/1993 | Griswold | 451/399 |
| 5,249,394 | 10/1993 | Griswold | 451/62 |
| 5,471,900 | 12/1995 | Corwin et al. | 82/1.11 |
| 5,544,556 | 8/1996 | Jones | 82/1.11 |
| 5,700,186 | 12/1997 | Hykes et al. | 451/399 |

FOREIGN PATENT DOCUMENTS

| | | |
|---|---|---|
| 0 397 049 | 11/1990 | European Pat. Off. . |
| 0 557 969 A1 | 9/1993 | European Pat. Off. . |
| 55-164452 | 12/1980 | Japan . |
| 57-21261 | 2/1982 | Japan ................ 451/399 |
| 62-15070 | 1/1987 | Japan . |
| 1-58468 | 3/1989 | Japan ................ 451/399 |
| 02 292148 | 12/1990 | Japan . |
| 3-19757 | 1/1991 | Japan . |
| 07 060613 | 3/1995 | Japan . |
| 2 240 941 | 8/1991 | United Kingdom . |

*Primary Examiner*—Daniel W. Howell
*Assistant Examiner*—Christopher Kirkman
*Attorney, Agent, or Firm*—D. Peter Hochberg; Christopher P. Harris

[57] ABSTRACT

A crankshaft phase indexing apparatus of this invention is provided with a pair of spindles arranged in alignment with a first axis. The Spindles are rotated respectively by a pair of spindle driving motors, which are controlled to rotate at the same speed. Chucks are mounted to the respective spindles. The chucks hold ends of a crankshaft in alignment with a second axis, which is displaced from and parallel to the first axis. A phase conversion shaft is rotatably arranged in at least one of the chucks in alignment with the second axis. The phase conversion shaft is connected to the crankshaft for rotating the crankshaft to permit phase indexing of crankpins of the crankshaft into axial alignment with the first axis. A phase indexing shaft, which is coupled to the phase conversion shaft, is located concentrically with the spindles and is rotated by a phase indexing motor. A control device for controlling the phase indexing motor and the spindle driving motors executes a first mode, in which the phase conversion shaft is revolved with the pair of spindles about the first axis to perform an operation on the crankshaft, and a second mode, in which the phase conversion shaft is rotated about the second second axis to index the crankshaft. Further, a link coupling is located between the phase conversion shaft and the phase indexing shaft. The link coupling is capable of changing the center distance between the first and second axes.

21 Claims, 8 Drawing Sheets

CRANKPIN PHASE INDEXING METHOD AND APPARATUS

BACKGROUND OF THE INVENTION

1. Field of the Invention

This invention relates to a crankpin phase indexing apparatus and a phase indexing method applied to a crankpin grinding machine for machining, for example, grinding or polishing, a crankpin of a crankshaft.

2. Description of the Related Art

In this type of crankpin phase indexing apparatus, in general, two spindles are rotatably supported by a pair of head stocks, respectively, in axial alignment with each other, and chucks for holding journals on both ends of a crankshaft at locations spaced from the axis of the spindles are mounted to the inner ends of the respective spindles. Spindle driving motors are coupled to the pair of head stocks, respectively. As the spindles are rotated by the respective spindle driving motors, the crankshaft turns around its crankpin that is located in axial alignment with the spindles, whereby the outer peripheral surface of this crankpin can be subjected to machining such as grinding or polishing by means of a rotating grinding stone.

The crankpin phase indexing apparatus includes a phase indexing motor and a phase indexing shaft arranged in association with one of the chucks. As the phase indexing shaft is rotated for indexing by the phase indexing motor, the crankshaft rotates about the journals so that crankpins of the crankshaft, which have different phases, may be selectively set in the machining position and aligned with the axis of the spindles.

In such crankpin phase indexing apparatus, during phase indexing, the phase indexing shaft alone is rotated with the spindles stopped. During the machining operation, on the other hand, the phase indexing shaft is required to be rotated together with the spindles so that the phase indexing shaft is held in a fixed position in relation to the spindles.

To this end, in a conventional phase indexing apparatus, a complicated planetary gear mechanism is interposed between the phase indexing shaft and the spindle so that one of two modes, that is, either the phase indexing by means of the phase indexing shaft or the machining operation, may be selected through operation of the planetary gear mechanism, as disclosed in Japanese Unexamined Patent Publication No. 7-60623, for example.

The conventional phase indexing apparatus, however, has the problem that the apparatus is complicated in structure and is large in overall size, because the planetary gear mechanism includes numerous gears. Also, there is the problem that the manufacturing cost is high. In addition, since the gears in the planetary gear mechanism clatter or chatter, loud noise is produced, deteriorating the crankpin machining environment. Also, the machining accuracy is lowered due to wear of the gears, and maintenance such as lubrication of the gears is required.

When the crankshaft is replaced with one having a different crank arm length, the chucks are adjusted to change the distance between the axis of each spindle and the axis of the corresponding chuck. To permit the distance to be changed, a link coupling, for example, a Schmidt coupling (trade name) 201 shown in FIG. 11, is arranged between the spindle and the chuck.

The Schmidt coupling 201 comprises a driving coupling plate 202 aligned with the axis of the spindle for rotation together therewith, an intermediate coupling plate 203, and a driven coupling plate 204 aligned with the axis of the chuck for rotation together therewith. The intermediate coupling plate 203 is coupled at one side to the driving coupling plate 202 by links 205, and is coupled at the other side to the driven coupling plate 204 by links 206.

As shown in FIG. 12, the center $\alpha$ of the driving coupling plate 202 and the center $\beta$ of the driven coupling plate 204 coupled to the driving coupling plate 202 via the intermediate coupling plate 203 are located on a line $\gamma$, which extends in the direction in which the center distance $\epsilon$ between the axes of the spindle and the chuck may be increased or decreased.

Usually, in this Schmidt coupling 201, a minimum specified value $\delta$ is set to define an unstable region with regard to the approaching of the centers $\alpha$ and $\beta$, and the distance between the centers $\alpha$ and $\beta$ is limited so that it may not become smaller than the value $\delta$. If the distance between the centers $\alpha$ and $\beta$ is smaller than the minimum specified value $\delta$, then the links 205 and 206 exceed the dead point, so that the position of the intermediate coupling plate 203 becomes unstable, which causes vibration.

Accordingly, consideration must be given to the space where the Schmidt coupling 201 is installed, and also, the vibration produced is transmitted to the entire Schmidt coupling, which adversely affects the machining operation. With the conventional arrangement shown in FIG. 12, therefore, when increasing or decreasing the center distance $\epsilon$ between the spindle and the chuck in accordance with a change in the crank arm length of the crankshaft, there is a restriction on the range within which the Schmidt coupling 201 can satisfactorily follow the increase or decrease of the center distance.

Specifically, the distance $\epsilon$ between the first axis $\alpha$, which is the axis of the spindle, and the second axis $\beta$, which is the axis of the chuck, cannot be made smaller than the value corresponding to the aforementioned minimum specified value $\delta$. Therefore, the driven coupling plate 204 can be moved toward the driving coupling plate 202 up to a limit position $\theta$ indicated by the two-dot-chain line in FIG. 12, and the coupling cannot be used with a crankshaft, the crank arm length of which is smaller than the above value $\delta$.

Generally, a crankpin, as a workpiece, is low in rigidity; therefore, in this type of crankshaft grinding machine, the crankshaft must be rotated so that it does not undergo twisting or the like during the machining operation. To this end, a synchronous driving unit has conventionally been proposed in which the two spindles are operatively coupled to each other by a synchronizing shaft so that synchronous rotation of the two spindles is achieved by the synchronizing shaft.

In this conventional synchronous driving unit, however, since the two spindles must be rotated exactly in synchronism with each other via the synchronizing shaft, it is necessary that labor-consuming adjustments be performed in order to, for example, eliminate the backlash of the rotary coupling parts, and also, a large-diameter, high-rigidity synchronizing shaft must be used to prevent the twisting thereof. In addition, after long use of the unit, its rotary driving system may become loose due to wear or the like, possibly making the spindles fail to rotate in perfect synchronism.

To cope with these problems, another type of synchronous driving unit has conventionally been proposed in which separate motors are operatively coupled to the respective spindles and are subjected to synchronous rotation control. With this conventional unit, however, the two motors may possibly fail to rotate synchronously due to abnormality or the like of the control system associated with one of the motors. If the synchronous rotation fails, then the crankshaft will be twisted and the machining accuracy will deteriorate.

To solve the problem, still another type of synchronous driving unit having an arrangement as shown in Japanese Utility Model Examined Publication No. 7-23945, for example, has conventionally been proposed. In this conventional arrangement, the two spindles are synchronously rotated by a pair of motors, respectively, and are rotatably interlocked by a security shaft having an axis displaced from the axis of the spindles. If the synchronous control fails due to a motor fault or the like, rotation of one spindle is transmitted to the other via the security shaft, whereby the crankshaft is prevented from being excessively twisted.

In this conventional synchronous driving unit, when the synchronism of the two spindles is lost due to an abnormality or the like of the motor control system, the rotational force of one spindle is used to forcibly rotate the other spindle via the security shaft, thereby mechanically ensuring the synchronism of the two spindles. Accordingly, in the event the synchronism is lost, the security shaft is required to transmit torque and thus must be thick and firm. This, however, entails a significant increase in the weight of the security shaft, and also, during normal operation, in which the security shaft need not function, the heavy security shaft consumes motor power, thus causing energy loss.

Further, in the case where the synchronism of the two spindles is lost due to an abnormality or the like of the control system of one motor, the opposite ends of the crankshaft are acted upon by different magnitudes of driving torque, and as the crankshaft in this state is forcibly rotated by the security shaft, it becomes twisted. If the machining operation is continued with the crankshaft twisted, the machining accuracy may greatly deteriorate.

SUMMARY OF THE INVENTION

This invention was accomplished in view of the problems associated with the conventional techniques described above. An object of the invention is to provide a crankpin phase indexing apparatus and a phase indexing method that permit the apparatus to be simpler, smaller, quieter, less expensive to manufacture, easier to maintain, and more accurate.

To achieve the above object, according to this invention, a pair of spindles are arranged in alignment with a first axis so as to face each other with a space therebetween and are rotated respectively by a pair of spindle driving motors, which are subjected to synchronous control. Chuck bodies are mounted to extreme ends of the spindles, respectively. Chuck sections are arranged at the chuck bodies, respectively, for holding journals at opposite ends of a crankshaft in alignment with a second axis, which is displaced from and parallel to the first axis. A phase conversion shaft is arranged in at least one of the chuck bodies in alignment with the second axis and engages with an end face of the crankshaft for rotating the crankshaft to permit phase indexing of crankpins with different phase angles in alignment with the first axis. A phase indexing shaft is coupled to the phase conversion shaft and is rotated by a phase indexing motor. Control means for controlling the phase indexing motor and the spindle driving motors is provided to execute a first mode, in which the phase conversion shaft is rotated synchronously with the pair of spindles at an identical speed, and a second mode, in which the phase conversion shaft is rotated with a relative speed difference from the pair of spindles.

Thus, according to this invention, either the first mode or the second mode is selected by the control means, so that a machining operation for machining crankpins or, an indexing operation for selecting a crankpin can be performed. Therefore, the machining operation and the indexing operation can be carried out by switching the modes, without the need to use a complicated planetary gear mechanism, whereby the apparatus is simplified in structure.

According to another aspect of the invention, a link coupling is interposed between the phase conversion shaft and the phase indexing shaft and is capable of changing a center distance between the axes of these two shafts.

The link coupling permits the apparatus to be used with crankshafts having different crank arm lengths.

According to still another aspect of the invention, the link coupling comprises a driving-side coupling plate, a driven-side coupling plate, an intermediate coupling plate located between the driving- and driven-side coupling plates, and links interposed between adjacent ones of the coupling plates. The driving-side coupling plate is coupled to the phase indexing shaft by gears and has a center position thereof displaced from the center of the phase indexing shaft by a predetermined amount in a direction at right angles to a direction in which the center distance between the phase indexing shaft and the phase conversion shaft is increased or decreased.

Since the center position of the driving-side coupling plate is displaced in a direction at right angles to the direction in which the center distance between the phase indexing shaft and the phase conversion shaft is increased or decreased, the center distance can be freely increased or decreased by means of the link coupling without being restricted by a minimum specified value defining an unstable region of the link coupling.

According to a further aspect of the invention, a detection shaft is provided, which couples the motor shafts of the two spindle driving motors to each other and which includes detecting means for detecting asynchronous rotation of the motor shafts so that the spindle driving motors may be stopped upon detection of the asynchronous rotation.

Thus, if the motor shafts of the two spindle driving motors fail to rotate synchronously due to an abnormality or the like of control systems associated with these motors, such asynchronous rotation is detected by the detecting means, so that the rotation of the two spindle driving motors can be immediately brought to a stop.

DETAILED DESCRIPTION OF THE REFERRED EMBODIMENT

Embodiments of this invention will be hereinafter described in detail with reference to FIGS. 1 through 10.

Figure 1:
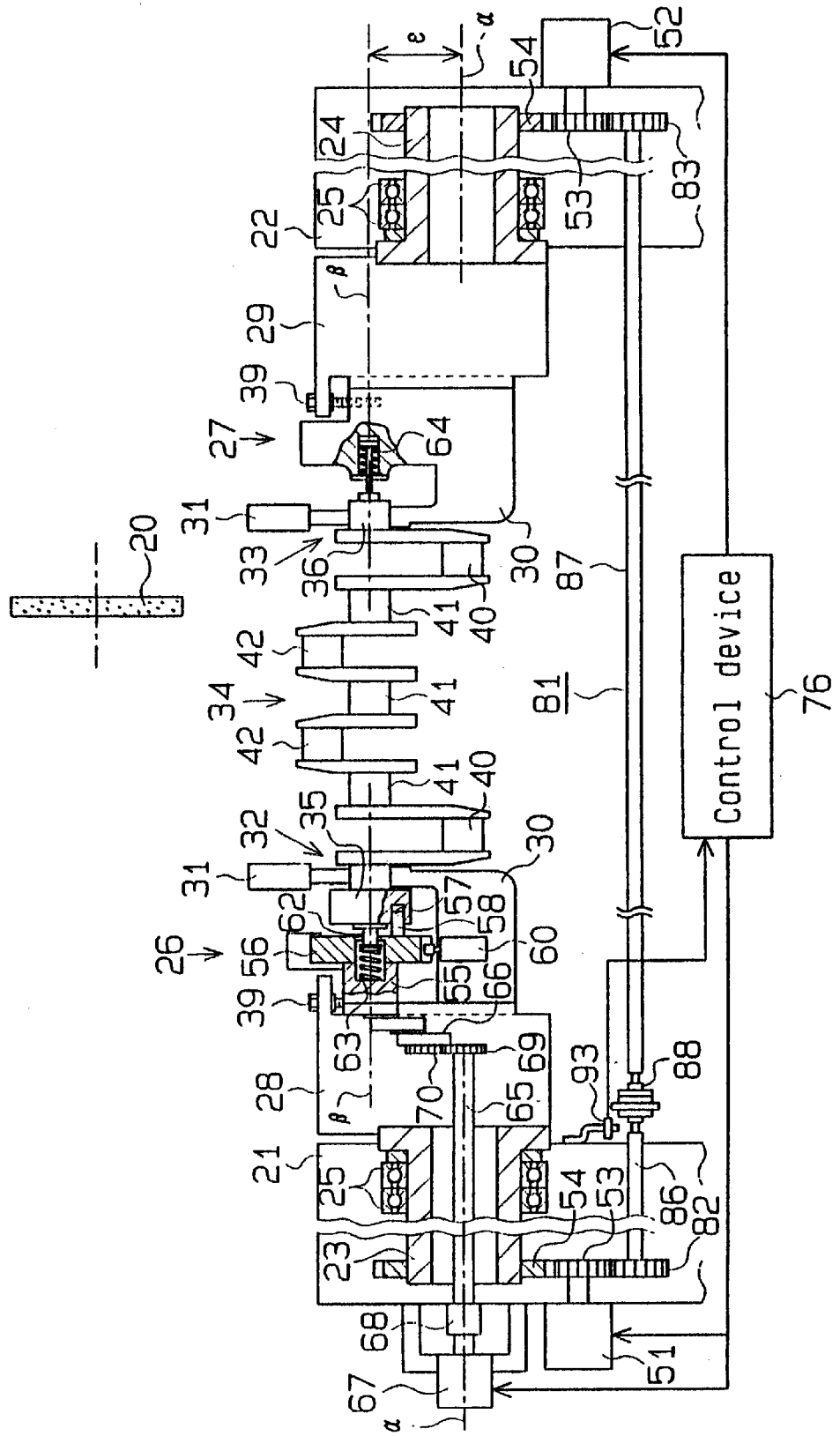
FIG. 1 is a diagrammatic sectional view of a crankpin grinding machine to which this invention is applied.

As shown in FIG. 1, a pair of head stocks 21 and 22 are placed on a table, not shown, so as to face each other with a predetermined distance therebetween. Hollow spindles 23 and 24 are rotatably supported by the respective head stocks 21 and 22 via bearings 25 such that they are in alignment with a first axis $\alpha$.

Figure 2:
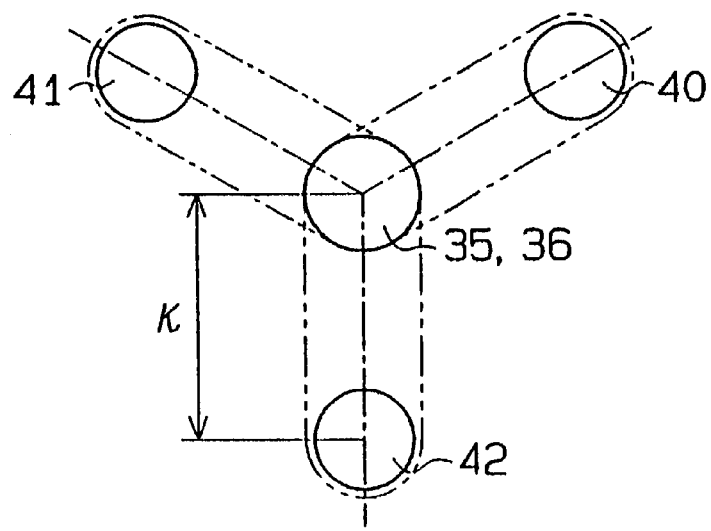
FIG. 2 is a diagram illustrating the phase indexing of crankpins.

Chuck bodies 26 and 27 are mounted respectively to the inner ends of the spindles 23 and 24 through mounting members 28 and 29. Clamping sections 32 and 33, or chuck sections, each of which includes a holder 30 and a clamp arm 31, are arranged at the inner end portions of the chuck bodies 26 and 27, respectively. These clamping sections 32 and 33 serve to hold journals 35 and 36, which are on opposite ends of a crankshaft 34, respectively, in alignment with a second axis $\beta$ parallel to the first axis $\alpha$. As shown in FIG. 2, the distance $\epsilon$ between the second axis $\beta$ and the first axis $\alpha$ is set in accordance with the distance between the center of the journals 35 and 36 of the crankshaft 34 and the center of individual pins 40 to 42, that is, the length $\kappa$ of the crank arms.

Also, the chuck bodies 26 and 27 are mounted to the respective mounting members 28 and 29 such that their movements in a direction such that the distance $\epsilon$ between the second and first axes $\beta$ and $\alpha$ is increased or decreased, that is, in a direction at right angles to the first axis $\alpha$, are adjustable. By turning adjusting screws 39 with a nut runner or the like, not shown, it is possible to move the chuck bodies 26 and 27 and thereby adjust the distance $\epsilon$ between the axes $\alpha$ and $\beta$.

Further, with the crankshaft 34 held between the chuck bodies 26 and 27, any of the crankpins 40 to 42, for example, the crankpins 40 near the ends of the crankshaft 34, are positioned in alignment with the first axis $\alpha$ of the spindles 23 and 24.

A pair of spindle driving motors 51 and 52, each comprising a servomotor, are mounted in association with the spindles 23 and 24, respectively, and the motor shafts thereof are operatively coupled to the respective spindles 23 and 24, each via a pair of gears 53 and 54. As the spindle driving motors 51 and 52 rotate synchronously, the spindles 23 and 24 are synchronously rotated at the same speed in the same direction, whereby the crankshaft 34 held between the clamping sections 32 and 33 rotates about the crankpins 40 to 42 that are located in axial alignment with the first axis $\alpha$ of the spindles 23 and 24. Accordingly, the journals 35 and 36 on the opposite ends of the crankshaft 34 revolve around the selected crankpins 40 to 42, and the first axis $\alpha$ together with the chuck bodies 26 and 27. During the revolving motion, a grinding wheel 20, which is rotating, is brought into contact with one of the crankpins 40 to 42 that is axially aligned with the first axis $\alpha$, so that the outer peripheral surface of this crankpin is ground or polished.

Figure 3:
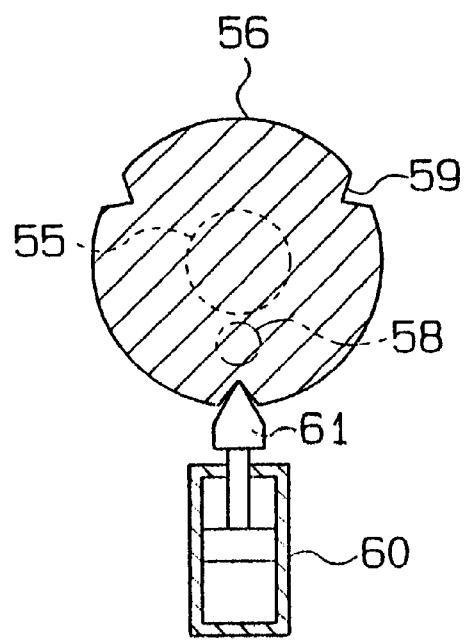
FIG. 3 is an enlarged, partly sectional view showing a positioning structure of a phase indexing shaft.

As shown in FIGS. 1 and 3, a phase conversion shaft 55 is rotatably supported by one chuck body 26 such that it is in axial alignment with the second axis $\beta$. An indexing plate 56 is fixed to the phase conversion shaft 55 and has pin 58 protruding from one end face thereof for engagement with an eccentric hole 57 formed in one end face of the crankshaft 34. The indexing plate 56 also has a plurality of engaging grooves 59, or indexing elements, formed in an outer periphery thereof at predetermined phases identical with the phases at which the crankpins 40 to 42 are arranged.

A cylinder 60 is arranged on the chuck body 26 so as to face the peripheral surface of the indexing plate 56, and its piston rod is fitted with an engaging member 61 as a holding member that can be engaged with and disengaged from the engaging grooves 59 of the indexing plate 56. The engaging member 61 is engaged with one of the engaging grooves 59 of the indexing plate 56, whereby the indexing plate 56 and thus the phase conversion shaft 55 are positioned and held at the selected index angle and a corresponding one of the crankpins 40 to 42 is positioned and held in alignment with the first axis $\alpha$ of the spindles 23 and 24.

A pusher 62 is arranged in the indexing plate 56 and the phase conversion shaft 55 and is pushed outward therefrom by the urging force of a spring 63 into contact with one end face of the crankshaft 34 for supporting the same. A cylinder 64 is formed in the chuck body 27 opposite to the one provided with the pusher 62 and pushes the other end face of the crankshaft 34 with its piston rod, so that the crankshaft 34 is engaged with the pin 58 of the indexing plate 56.

A phase indexing shaft 65 is passed through the center of the aforementioned spindle 23 and is rotatably supported by bearings, not shown, so as to be rotatable relative to the spindle 23. As a link coupling, a Schmidt coupling 66, for example, is used, and this Schmidt coupling 66 is interposed between the phase indexing shaft 65 and the phase conversion shaft 55 such that the two shafts 55 and 65 are operatively coupled to each other via the Schmidt coupling 66 and a pair of gears 69 and 70 at a rotation transmission ratio of one to one. A phase indexing motor 67 is mounted on one head stock 21 and has a motor shaft directly coupled to the phase indexing shaft 65 through a coupling 68.

Figure 4:
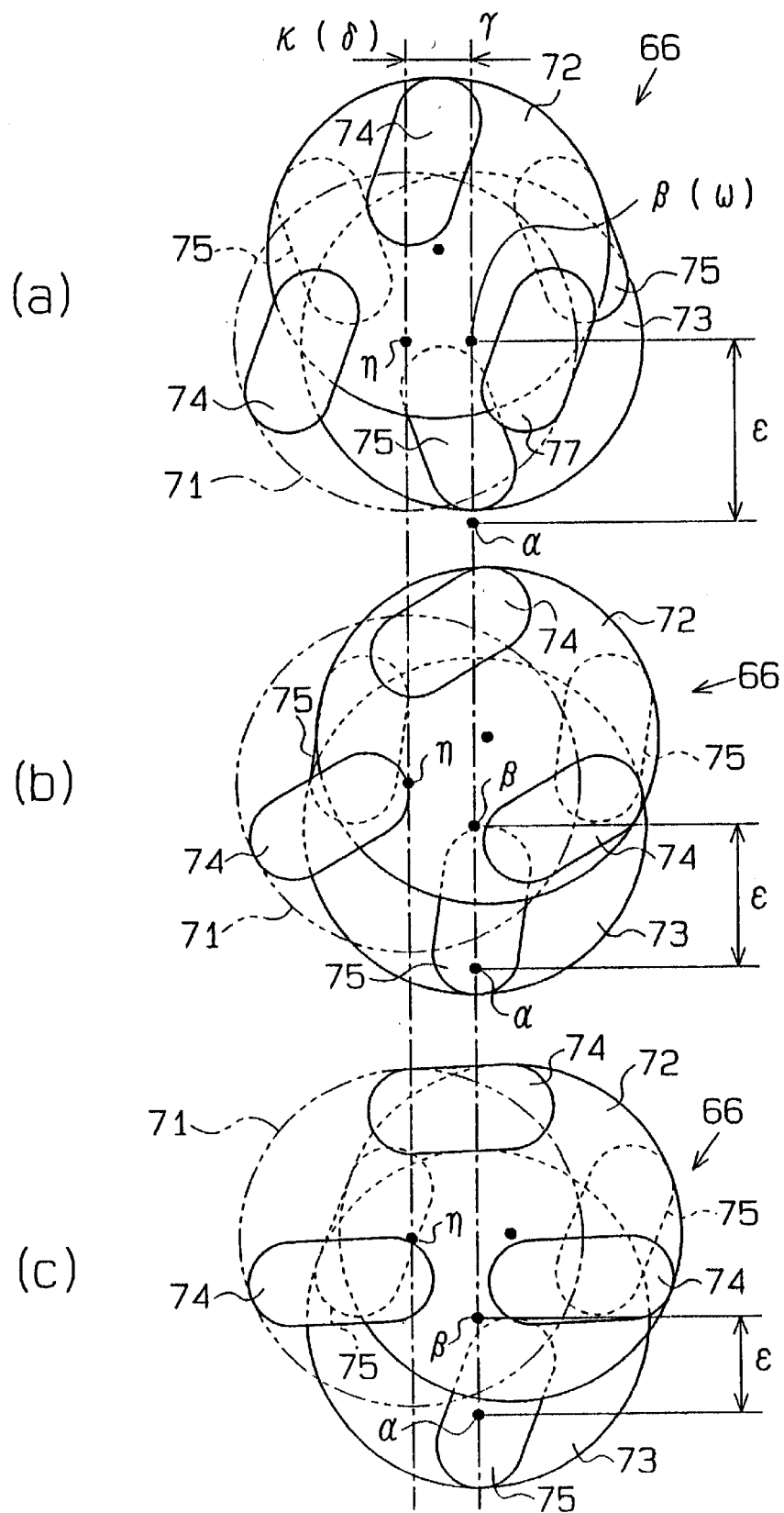
FIG. 4 illustrates the operation of a Schmidt coupling as a link coupling.
Figure 5:
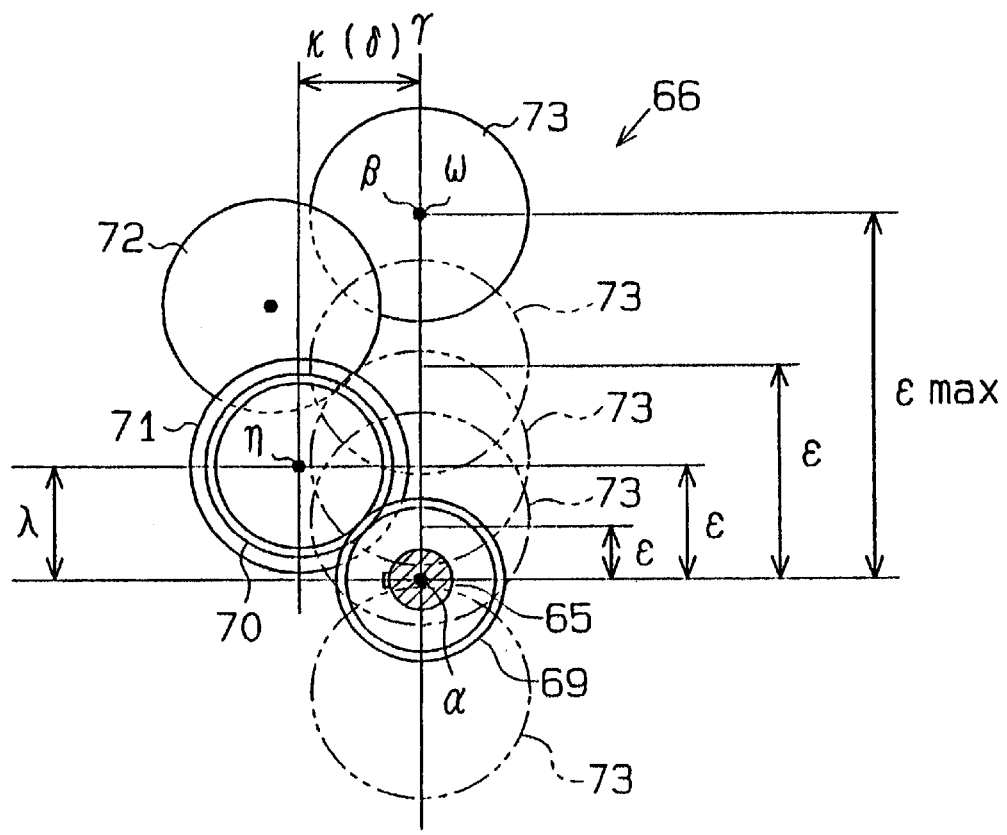
FIG. 5 is a diagram also illustrating the operation of the Schmidt coupling.

As shown in FIGS. 1, 4 and 5, the Schmidt coupling 66 includes a driving coupling plate 71, an intermediate coupling plate 72, and a driven coupling plate 73. The driving coupling plate 71 is rotatably supported by the mounting member 28 so that the center $\eta$ thereof is displaced by the predetermined distance $\kappa$ in a direction at right angles to the line $\gamma$ connecting the first and second axes $\alpha$ and $\beta$.

The driven coupling plate 73 is fixed to the phase conversion shaft 55 concentrically. The intermediate coupling plate 72 is coupled at one side to the driving coupling plate 71 via three links 74 and is coupled at the other side to the driven coupling plate 73 via three links 75. The driven coupling plate 73 has its center $\omega$ lying on the second axis $\beta$.

The predetermined distance $\kappa$ is set to a distance at least greater than or equal to an unstable region of the Schmidt coupling 66, that is, a distance greater than or equal to the value corresponding to a minimum specified value $\delta$ of approach distance between the center $\eta$ of the driving coupling plate 71 and the center $\omega$ of the driven coupling plate 73. When the crankshaft 34 to be machined is replaced with one having a different crank arm length, the chuck bodies 26 and 27 are moved in a diametrical direction such that the second axis $\beta$ of the phase conversion shaft 55 is moved in a direction toward or away from the first axis $\alpha$ of the phase indexing shaft 65, thereby adjusting the distance between the first and second axes α and β. At this time, the positional relationship among the individual plates 71, 72 and 73 changes as shown in (*a*), (*b*) and (*c*) of FIG. 4. FIG. 5 schematically illustrates the positional relationship for ease of understanding.

A control device 76, which constitutes control means, executes one of two modes for controlling the operation of the phase indexing motor 67 and the two spindle driving motors 51 and 52. Specifically, during machining, a first mode for machining is executed by the control device 76, whereby the phase indexing motor 67 and the two spindle driving motors 51 and 52 are controlled so as to synchronously rotate at the same speed, and thus the phase conversion shaft 55 is revolved together with the spindles 23 and 24 in the same direction via the phase indexing shaft 65 and the Schmidt coupling 66 about the first axis α. On the other hand, during phase indexing for the pins 40 to 42 of the crankshaft 34, a second mode for phase indexing is executed by the control device 76. In this case, with the two spindle driving motors 51 and 52 either stopped or rotated, the phase indexing motor 67 is subjected to synchronous rotation control so as to rotate with a relative speed difference from the spindle driving motors 51 and 52. Consequently, the phase conversion shaft 55 is subjected to relative rotation about the second axis β for phase indexing with respect to the spindles 23 and 24 by means of the phase indexing shaft 65 and the Schmidt coupling 66.

Figure 7:
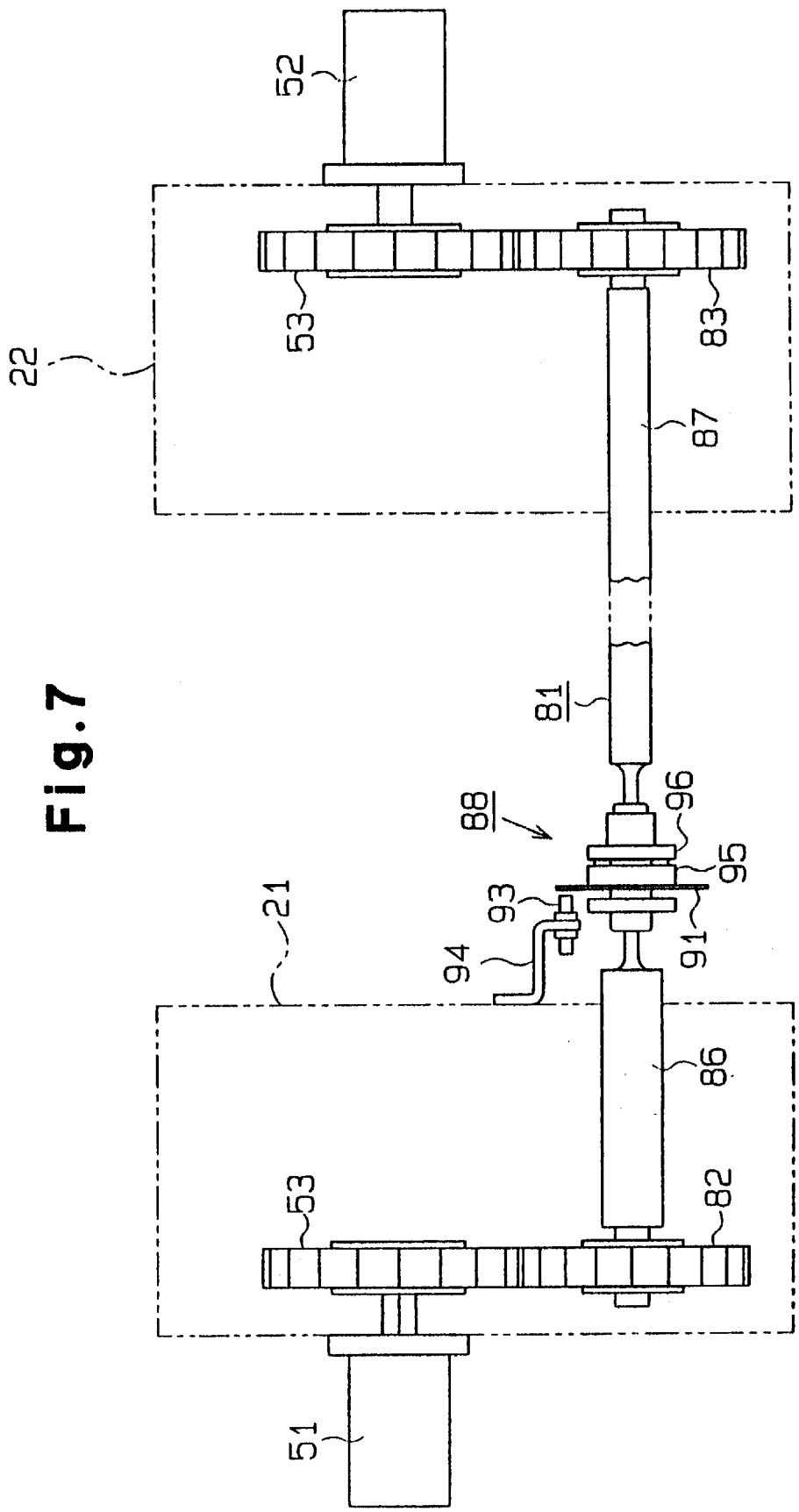
FIG. 7 is an enlarged side view showing a detection mechanism.

As shown in FIGS. 1 and 7, a detection shaft 81 is rotatably supported between the two head stocks 21 and 22 and has opposite ends operatively coupled to the motor shafts of the spindle driving motors 51 and 52 through gears 82 and 83, respectively. This detection shaft 81 is arranged in such a manner that its axis is displaced from the first and second axes α and β but parallel to the axes α and β. Also, the detection shaft 81 is formed of two parts 86 and 87 divided at a location close to the one head stock 21, and a clutch 88 is interposed between the two divided parts.

Figure 8:
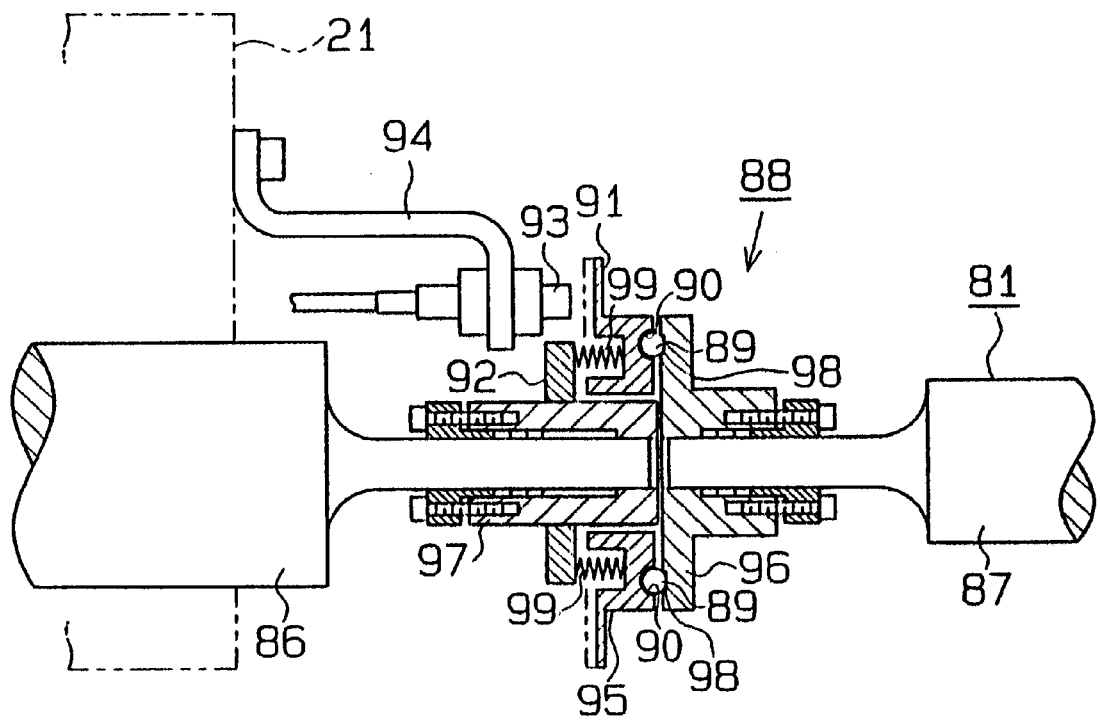
FIG. 8 is an enlarged view, partly in longitudinal section, of a clutch mechanism shown in FIG. 7.

The clutch 88 includes, as shown in FIGS. 7 and 8, a pair of clutch plates 95 and 96 arranged so as to face the divided parts of the detection shaft 81. The first clutch plate 95 is axially movably fitted and supported on a clutch plate supporting member 97, which is fixed to one part 86 of the detection shaft 81. On the other hand, the second clutch plate 96 is securely fitted on the other part 87 of the detection shaft 81.

The first clutch plate 95 has a plurality of retaining holes 90 formed therein for receiving respective balls 89, while the second clutch plate 96 has a plurality of engaging recesses 98 formed therein for slidable engagement with the respective balls 89. Also, a detection flange 91 protrudes integrally from the outer peripheral edge of the first clutch plate 95.

Figure 9:
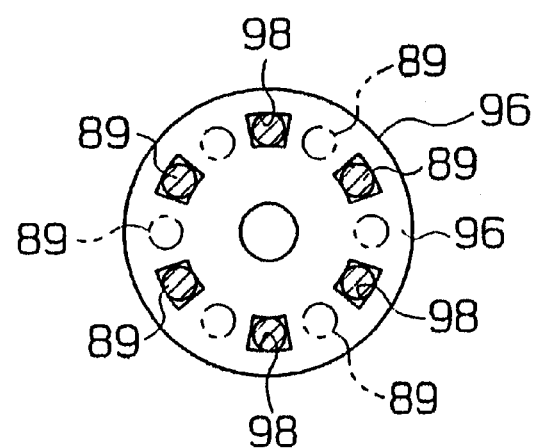
FIG. 9 is an enlarged view, partly in cross section, of the clutch mechanism in FIG. 7.

A plurality of coil springs 99 are interposed between a ring member 92 fixed to the clutch plate supporting member 97 and the first clutch plate 95 and urge the first clutch plate 95 toward the second clutch plate 96. Normally, the balls 89 in the retaining holes 90 of the first clutch plate 95 are engaged with the respective recesses 98 of the second clutch plate 96 due to the urging force exerted by the coil springs 99, as shown in FIG. 9, so that the two clutch plates 95 and 96 are held in a coupled state.

A detector 93, or detecting means, which comprises a proximity switch, is mounted on one head stock 21 via a bracket 94 so as to face the detection flange 91 of the first clutch plate 95. Normally, as the two spindle driving motors 51 and 52 rotate synchronously, the two parts 86 and 87 of the detection shaft 81 rotate together with the two clutch plates 95 and 96 coupled by the balls 89 due to the urging force of the coil springs 99.

On the other hand, if the motor shafts of the two spindle driving motors 51 and 52 rotate asynchronously to a predetermined degree, torsional force acts upon the divided parts of the detection shaft 81. This torsional force causes the individual balls 89 to roll out of the engaging recesses 98 onto the end face of the second clutch plate 96 against the urging force of the coil springs 99, as indicated by the two-dot-chain lines in FIG. 9, so that the two clutch plates 95 and 96 are released from the connection and allowed to slip.

Figure 10:
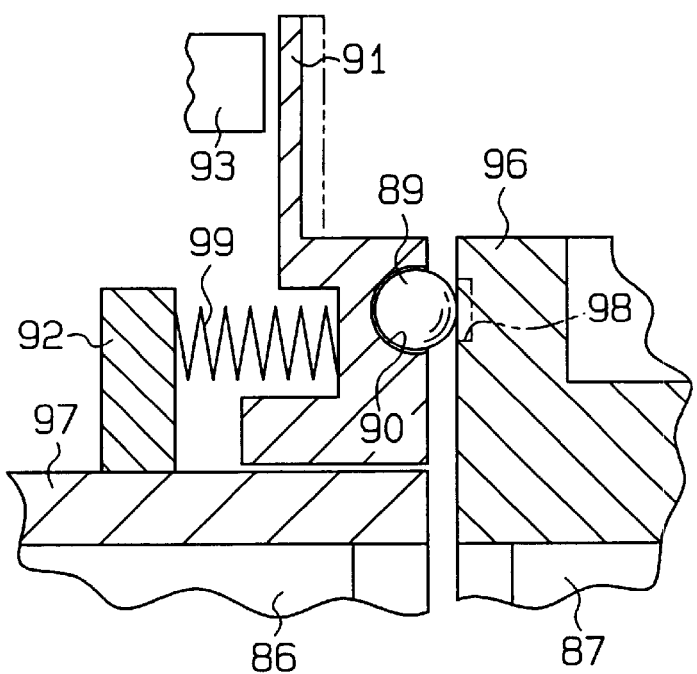
FIG. 10 is an enlarged sectional view showing a part in FIG. 8.
Figure 11:
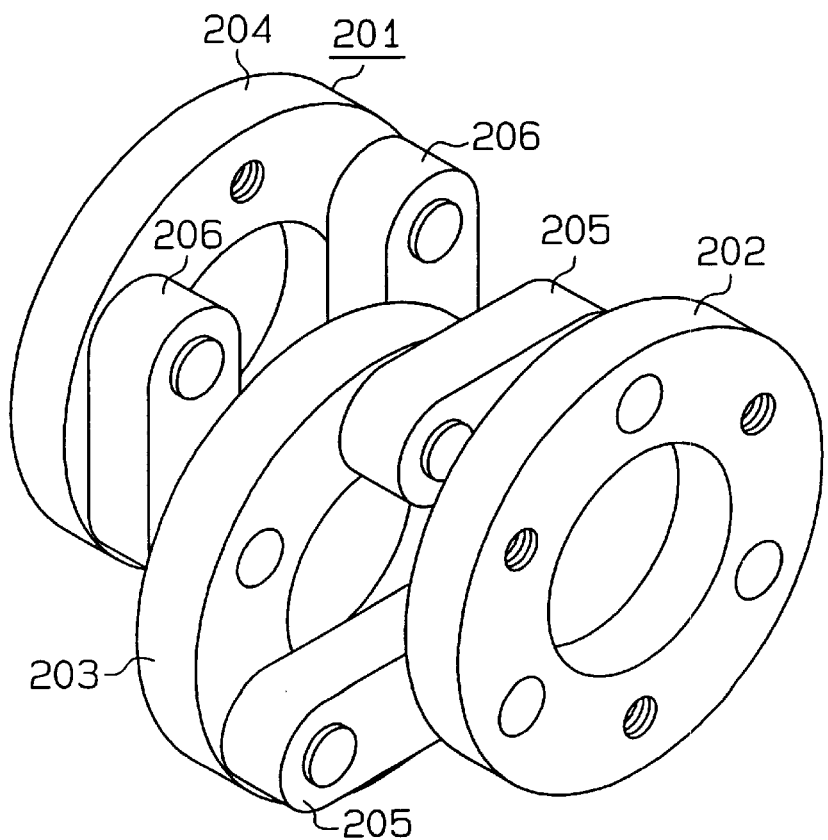
FIG. 11 is a perspective view showing a Schmidt coupling as a conventional link coupling.

As the balls 89 roll out of the engaging recesses 98 onto the end face of the second clutch plate 96, the first clutch plate 95 moves leftward from the state shown in FIG. 8 to the state shown in FIG. 10, while compressing the coil springs 99. Consequently, the detection flange 91 approaches the detector 93, which then outputs a detection signal to the aforementioned control device 76. In response to the detection signal from the detector 93, the control device 76 stops the rotation of the two spindle driving motors 51 and 52.

The operation of the phase indexing apparatus constructed as described above will now be explained.

When the phase indexing of the crankpins 40 to 42 is performed using the phase indexing apparatus, the second mode is executed by the control device 76. In this second mode, while the two spindle driving motors 51 and 52 are at rest, for example, the two clamping sections 32 and 33 are brought to a half-clamping state by actuating means, not shown, and with the engaging member 61 disengaged from the engaging grooves 59 of the indexing plate 56, the phase indexing shaft 65 is rotated through a predetermined angle by the phase indexing motor 67. Namely, there occurs a relative speed difference between the phase indexing shaft 65 and the spindles 23, 24. The second mode can be executed while the two spindle driving motors 51 and 52 are rotating, as described later.

Thus, the phase indexing shaft 65, the phase conversion shaft 55 and the indexing plate 56 are rotated for indexing relative to the chuck bodies 26 and 27. Concurrently with this indexing rotation of the indexing plate 56, the crankshaft 34 is rotated for indexing about the second axis β, and selected ones of the crankpins 40 to 42 of the crankshaft 34 are indexed and set in the machining position; that is, axially aligned with the first axis α of the spindles 23 and 24.

When the indexing is completed, the engaging member 61 of the cylinder 60 is engaged with the corresponding engaging groove 59 of the indexing plate 56, whereby the indexing plate 56 is positioned and held at the predetermined index angle. Subsequently, the journals 35 and 36 at opposite ends of the crankshaft 34 are clamped by the respective clamping sections 32 and 33, so that the crankshaft 34 is set in the required index position.

During a machining operation, on the other hand, the first mode is executed by the control device 76. While the first mode is executed, the phase indexing motor 67 and the two spindle driving motors 51 and 52 are subjected to synchronous rotation control such that they rotate in the same direction at the same speed, whereby the phase conversion shaft 55 is rotated together with the spindles 23 and 24 and the chuck bodies 26 and 27 via the phase indexing shaft 65 and the Schmidt coupling 66 about the first axis α. Consequently, the crankshaft 34 is rotated about the crankpin 40 to 42 that is indexed and positioned in alignment with the first axis α of the spindles 23 and 24, and the outer peripheral surface of that crankpin 40, 41 or 42 is machined by means of the grinding wheel 20.

Normally, during machining of the crankpins 40 to 42, the clutch 88 of the detection shaft 81 remains coupled through the balls 89 due to the urging force of the coil springs 58. Accordingly, while the spindles 23 and 24 are rotated synchronously by synchronous rotation of the two spindle driving motors 51 and 52 and thus machining operation is performed properly, the two parts 86 and 87 of the detection shaft 81 rotate together with each other through the clutch 88.

However, if, during machining operation, the rotations of the motor shafts of the two spindle driving motors 51 and 52 become asynchronous due to an abnormality or the like of the control system associated with one of the spindle driving motors, the clutch 88 of the detection shaft 81 is acted upon by torsional force. If the asynchronism of the motor shafts exceeds the predetermined amount so that the clutch 88 of the detection shaft 81 receives a torsional force greater than or equal to a predetermined force, a speed difference occurs between the two parts 86 and 87 of the detection shaft 81 and the two clutch plates 95 and 96 slip relative to each other.

Due to the slip of the clutch plates 95 and 96, the balls 89 roll out of the recesses 98 of the second clutch plate 96; therefore, the first clutch plate 95 moves leftward from the state shown in FIG. 8 and its detection flange 91 approaches the detector 93 as shown in FIG. 10. Consequently, the abnormal state, or the asynchronous state of the motor shafts, is detected by the detector 93, and the rotations of the spindle driving motors 51 and 52 are immediately stopped under control of the control device 76. Thus, the machining operation is never continued and the crankshaft 34 is not rotated when asynchronous rotation of the spindles 23 and 24 has occurred.

When the crankshaft 34 is replaced with one having a different crank arm length, the chuck bodies 26 and 27 are adjusted by turning the adjusting screws by means of a nut runner or the like, not shown, to thereby change the distance ε between the axes α and β. As the distance ε is changed, the Schmidt coupling 66 extends or contracts. Specifically, as the distance ε between the axes α and β is varied as shown in (a), (b) and (c) of FIG. 4, the center ω of the driven coupling plate 73 moves along the line γ in the direction in which the distance ε is increased or decreased. Accordingly, not only a crankshaft 34 with long crank arms but also a crankshaft 34 with short crank arms can be handled satisfactorily, covering a wide stroke change.

In this embodiment, the driving coupling plate 71 is located beforehand at an offset position where the center η thereof is displaced in a direction at right angles to the line γ and in the direction in which the distance ε between the axes α and β, is increased or decreased by the predetermined distance κ which is the stroke of the minimum specified value δ corresponding to the unstable region of the Schmidt coupling 66, as shown in FIG. 5. The phase indexing shaft 65 and the driving coupling plate 71 are directly coupled to each other by the gears 69 and 70.

With this arrangement, when the second axis β is moved closer to the first axis α, the center ω of the driven coupling plate 73 moves along the line γ. Therefore, the driven coupling plate 73 can pass by the driving coupling plate 71 and then can be moved further in the same direction, as indicated by the two-dot-chain lines in FIG. 5. Since the driven coupling plate 73 never approaches the driving coupling plate 71 closer than the distance κ distance, the Schmidt coupling 66 can operate without difficulty.

Specifically, the links 74 and 75 do not exceed their dead point, and thus the intermediate coupling plate 72 is always stabilized. Accordingly, even in the case where the crank arm length of the crankshaft 34 is very short, the distance between the axes of the phase indexing shaft 65 and the phase conversion shaft 55 can be freely increased or decreased through the Schmidt coupling 66, regardless of the minimum specified value δ of the Schmidt coupling 66.

Figure 12:
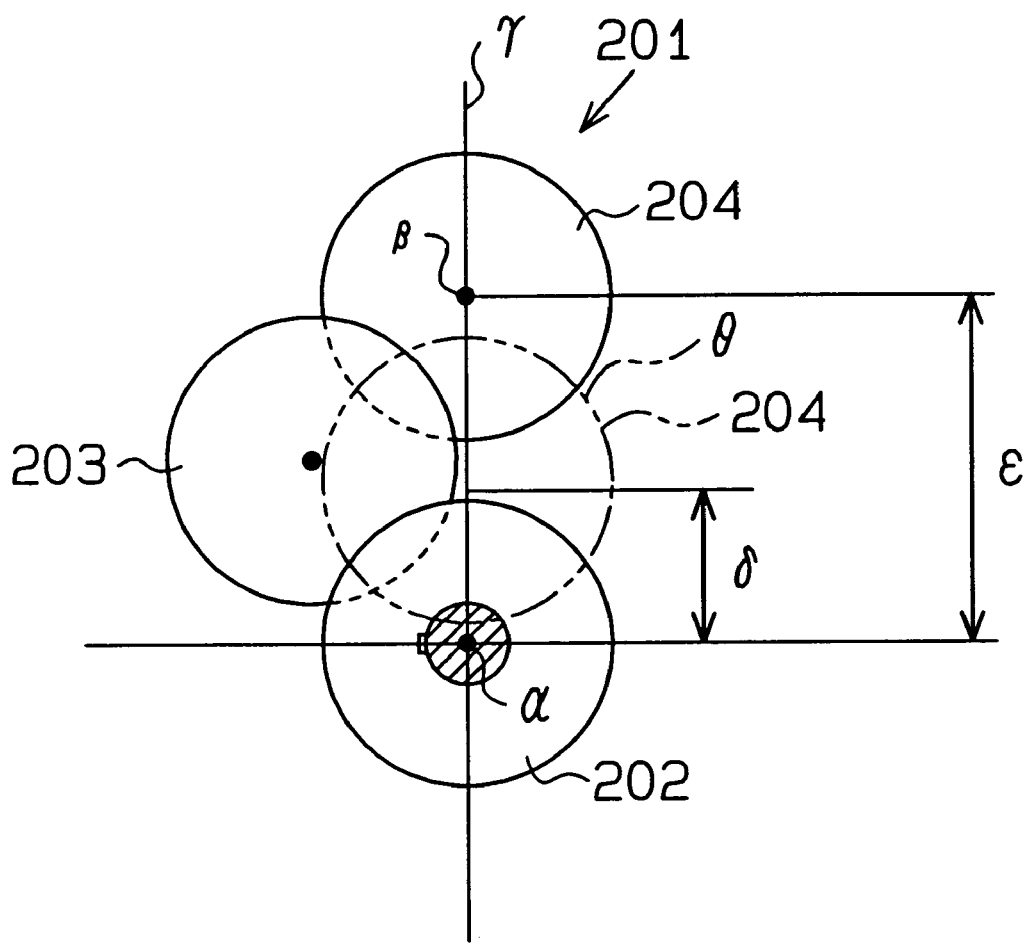
FIG. 12 is a diagram illustrating the operation of the conventional Schmidt coupling.

Further, in this embodiment, the driving coupling plate 71 is located at the offset position where the center η thereof is displaced from the perpendicular line γ by the predetermined distance κ in a direction at right angles to the line γ and is also displaced from the position of the phase indexing shaft 65 upward by the predetermined distance λ in the direction of the line γ, as shown in FIG. 5. This arrangement makes it possible to remove the restriction on the movement of the Schmidt coupling 66 in its contracting direction and also to increase the amount of movement of the Schmidt coupling in its extending direction by the offset amount corresponding to the distance λ, as compared with the conventional arrangement shown in FIG. 12. Accordingly, a single apparatus can be used for a variety of crankshafts 34 having crank arm lengths that cannot be handled by the conventional arrangement, including a crankshaft with a large crank arm length ε max as well as a crankshaft with a small crank arm length ε smaller than or equal to the minimum specified value δ.

As described above, in this phase indexing apparatus, the rotation of the phase indexing motor 67 and that of the two spindle driving motors 51 and 52 relative to each other during machining operation and during phase indexing are effected under synchronous rotation control, and therefore, it is unnecessary to employ a complicated planetary gear mechanism between the phase indexing shaft 65 and the spindle 23, 24. Accordingly, the apparatus is simplified in structure and reduced in overall size, and also, the manufacturing cost is reduced. Further, since no planetary gear mechanism is required, the problem of chattering or clattering noise of gears does not arise, and moreover, neither the replacement of gears because of wear nor maintenance such as lubrication is required.

Also, since the phase conversion shaft 55 is provided with the indexing plate 56, the phase conversion shaft 55 can be positioned and held at a predetermined index angle directly by mechanical engagement, whereby the indexing accuracy and the accuracy in maintaining the set position can be improved.

Further, the Schmidt coupling 66 is used as the link coupling for coupling the phase indexing shaft 65 and the phase conversion shaft 55, and therefore, the range within which the two shafts 65 and 55 can be moved toward and away from each other is increased, permitting the apparatus to be readily used with crankshafts 34 having different crank arm lengths. Especially, in the Schmidt coupling 66 of this embodiment, the center ω of the driven coupling plate 73 is moved in accordance with a change in the distance ε between the axes α and β in the direction of the line γ in which the distance ε is increased or decreased, as shown in (a), (b) and (c) of FIG. 4. Accordingly, not only a crankshaft 34 with long crank arms (the case shown in FIG. 4(a)) but also crankshafts with short crank arms, for example, a crankshaft whose crank arm length is slightly greater than the minimum specified value δ of the Schmidt coupling 66 (the case shown in FIG. 4(c)), can be handled satisfactorily, thus covering a wide stroke change, as mentioned above.

In addition, since the phase indexing shaft 65 is inserted through the hollow spindle 23, the arrangement of these shafts takes up less space, permitting a reduction in the overall size of the apparatus.

The detector 93 as the detecting means is arranged between the motor shafts of the two spindle driving motors 51 and 52 to detect asynchronous rotation. Thus, on detecting an abnormality in the synchronous rotation of the two motor shafts, the rotations of the two spindle driving motors 51 and 52 is immediately brought to a stop. Consequently, the crankshaft 34 held between the chuck bodies 26 and 27 mounted respectively to the ends of the two spindles 23 and 24 is not acted upon by torsional force, thereby avoiding the situation where the workpiece machining accuracy is lowered because the machining operation is continued with the crankshaft 34 subjected to torsional force. Further, since the detection shaft 81 extends in the same direction as the spindles 23 and 24, the entire structure is reduced in size.

Also, when asynchronism of the two spindles 23 and 24 has occurred, the clutch 88 is allowed to slip and the rotations of the spindles 23 and 24 are stopped. Thus, the detection shaft 81 need not perform the power transmission function; therefore, the detection shaft 81 used may be thin and light, so that the detection shaft 81 can be rotated with small torque, thereby reducing the energy loss.

Further, since the clutch 88 slips in the event of asynchronous rotation of the spindles 23 and 24, the detection shaft 81 is prevented from being damaged even if a very large torque difference occurs between the two parts 86 and 87 of the detection shaft 81.

This invention can be modified in various ways as described below.

A pair of phase indexing mechanisms, each including the phase indexing shaft 65 and the phase indexing motor 67, may be provided for the two spindles 23 and 24, respectively. This arrangement is suited for the phase indexing of crankshafts with large overall lengths.

The driving coupling plate 71 and the phase indexing shaft 65 may be coupled to each other by a toothed belt, instead of gear connection. With this arrangement, the distance κ of displacement can be increased, enhancing the degree of freedom of design.

Figure 6:
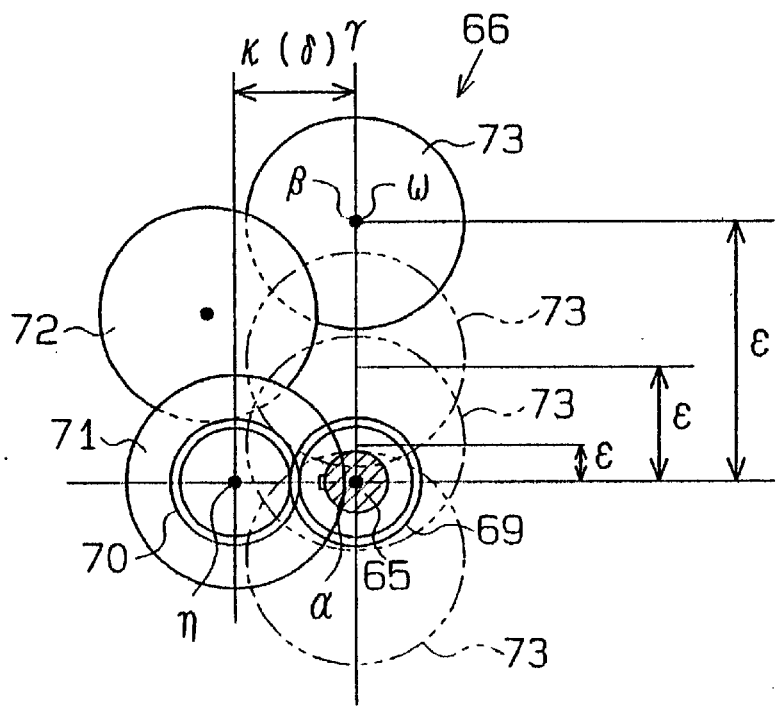
FIG. 6 is a diagram showing a Schmidt coupling according to another embodiment.

Instead of the arrangement of the Schmidt coupling 66 as the link coupling shown in FIG. 5, the offset of the center η of the driving coupling plate 71 by the predetermined distance λ in the direction of the line γ may be zero, as shown in FIG. 6. Also in this case, since the center η of the driving coupling plate 71 is offset from the perpendicular line γ by the predetermined distance κ in a direction at right angles to the line γ, there is no restriction on the movement of the Schmidt coupling 66 in its contracting direction and thus the apparatus can be used with crankshafts having very short crank arms.

The two spindle driving motors 51 and 52 may each be a built-in type. In the case of this arrangement, detection shafts 81 may be provided for the respective spindles 23 and 24 such that they are each arranged between the shafts of timing pulleys connected by a belt, for example.

As a positioning and holding member, a toothed or the so-called Curvic coupling, may be employ between the indexing plate 56 and the chuck body 26, 27. This arrangement permits the indexing and positioning of various pin phases.

In the first mode, the phase indexing motor 67 may be left undriven while the engaging member 61 of the chuck body 26, 27 may be engaged with an engaging groove 59 of the indexing plate 56 so that as the spindles 23 and 24 rotate, the phase conversion shaft 55 may be rotated together with the chuck bodies 26 and 27 about the first axis α.

When the spindle driving motors 51 and 52 are rotated in the second mode, the phase indexing motor 67 may be rotated at a speed different from that of the spindle driving motors 51 and 52, so that the phase indexing shaft 65 may be rotated with a relative speed difference from the spindles 23 and 24 to permit the phase indexing to be performed. In this case, the rotational speed of the spindle driving motors 51 and 52 alone, or the rotational speed of the phase indexing motor 67 alone, or the rotational speeds of both the spindle driving motors 51, 52 and the phase indexing motor 67 may be changed by the control device 76 to attain the purpose. This permits the phase indexing to be performed continuously following the machining operation, without the need to stop the individual motors 51, 52 and 67. The machining efficiency can therefore be enhanced.

As described above in detail, according to this invention, the apparatus requires no complicated planetary gear mechanism and thus can be simplified in structure and reduced in overall size, whereby the manufacturing cost is reduced, noise is suppressed and maintenance is facilitated. Also, high-accuracy machining can be performed on various crankshafts, and phase indexing can be carried out even during rotation of the spindles, thus improving the machining efficiency.

According to the invention, the positioning of the phase conversion shaft can be effected directly by mechanical engagement, so that the crankpin can be accurately set in a required index position, which contributes to high-accuracy machining. Also, according to this invention, in the event that the motor shafts of the two spindle driving motors fail to rotate synchronously due to an abnormality or the like of the control systems associated with the spindle driving motors, the rotation of the two spindle driving motors can be immediately brought to a stop.

We claim:

1. A crankshaft phase indexing apparatus for positioning a crankshaft, the crankshaft having a main axis and a number of crankpins, each crankpin having an axis parallel to the main axis, wherein the crankpins are arranged at predetermined angular positions about the main axis with respect to one another, the apparatus comprising:

a pair of spindles, wherein the spindles are each aligned with a first axis;

a pair of spindle driving motors, one of the spindle driving motors being operably coupled to each spindle, wherein the motors are controlled to drive the spindles synchronously;

a pair of axially aligned chucks, each of the chucks rotatably supporting one end of the crankshaft, wherein one of the chucks is connected to each spindle such that the axis of each chuck is aligned with a second axis, which is parallel to the first axis;

a phase conversion shaft rotatably arranged in one of the chucks in axial alignment with the second axis, wherein the phase conversion shaft is operably connected to one end of the crankshaft so that the phase conversion shaft can rotate the crankshaft about the second axis, wherein a predetermined amount of rotation of the phase conversion shaft serves to index a selected one of the crankpins into axial alignment with the first axis;

a phase indexing shaft coupled to the phase conversion shaft, wherein the phase indexing shaft is axially aligned with the first axis, and wherein the phase indexing shaft is rotatable independently of the rotation of the spindles;

a phase indexing motor for driving the phase indexing shaft;

control means for controlling the phase indexing motor and the spindle driving motors, wherein the control means executes a first mode in which the phase conversion shaft is rotated synchronously and a second mode in which the phase conversion shaft is rotated with a relative speed difference with respect to the spindles for indexing the crankpins.

2. The apparatus according to claim 1, wherein at least one of the spindles is hollow and the phase indexing shaft is located within the hollow spindle.

3. The apparatus according to claim 1, wherein the phase conversion shaft has a plurality of indexing elements formed at spaced angular positions that correspond to indexing positions of the crankshaft, and wherein one of the chucks has an engaging member for engaging one of the elements to position and hold the phase conversion shaft at a selected angular position.

4. The apparatus according to claim 3, wherein, in the first mode, the control means revolves the phase conversion shaft together with the chucks, and the phase conversion shaft is rotated together with said chucks via the engaging member as said spindles rotate.

5. The apparatus according to claim 1, further comprising a link coupling located between said phase conversion shaft and said phase indexing shaft, wherein the link coupling serves to change a center distance between the axes of said phase conversion shaft and said phase indexing shaft.

6. The apparatus according to claim 5, wherein at least one of the spindles is hollow and the phase indexing shaft is located within the hollow spindle.

7. The apparatus according to claim 5, wherein the phase conversion shaft has a plurality of indexing elements formed at spaced angular positions that correspond to indexing positions of the crankshaft, and wherein one of the chucks has an engaging member for engaging one of the elements to position and hold the phase conversion shaft at a selected angular position.

8. The apparatus according to claim 7, wherein in the first mode, the control means revolves the phase conversion shaft together with the chucks, and the phase conversion shaft is rotated together with said chucks via the engaging member as said spindles rotate.

9. The apparatus according to claim 5, wherein said link coupling comprises a driving-side coupling plate, a driven-side coupling plate, an intermediate coupling plate located between the driving-side and driven-side coupling plates, and links located between adjacent ones of the coupling plates, the driving-side coupling plate being coupled to said phase indexing shaft by gears, wherein the driving-side coupling plate has a center axis displaced by a predetermined amount from an imaginary line connecting the first and the second axes.

10. The apparatus according to claim 9, wherein said chucks are adjustable so that the main axis of the crankshaft can be moved along the imaginary line.

11. The apparatus according to claim 1, therein the control means controls the spindle driving motors so that the spindles are rotated at a first rotating speed for performing the operation on the crankpin, and wherein the control means controls the phase indexing motor so that the phase indexing shaft is rotated at a second rotating speed for indexing the crankpins.

12. The apparatus according to claim 11, wherein when indexing is being performed the control means controls the spindle motors at the first rotating speed and the phase indexing motor at the second rotating speed.

13. A crankshaft phase indexing apparatus for positioning a crankshaft, the crankshaft having a main axis and a number of crankpins, each crankpin having an axis parallel to the main axis, wherein the crankpins are arranged at predetermined angular positions about the main axis with respect to one another, the apparatus comprising:

a pair of spindles, wherein the spindles are each aligned with a first axis;

a pair of spindle driving motors, one of the spindle driving motors being operably coupled to each spindle, wherein the motors are controlled to drive the spindles synchronously;

a pair of axially aligned chucks, each of the chucks rotatably supporting one end of the crankshaft, wherein one of the chucks is connected to each spindle such that the axis of each chuck is aligned with a second axis, which is parallel to the first axis;

a phase conversion shaft rotatably arranged in one of the chucks in axial alignment with the second axis, wherein the phase conversion shaft is operably connected to one end of the crankshaft so that the phase conversion shaft can rotate the crankshaft about the second axis, wherein a predetermined amount of rotation of the phase conversion shaft serves to index a selected one of the crankpins into axial alignment with the first axis;

a phase indexing shaft coupled to the phase conversion shaft, wherein the phase indexing shaft is axially aligned with the first axis;

a phase indexing motor for driving the phase indexing shaft;

control means for controlling the phase indexing motor and the spindle driving motors, wherein the control means executes a first mode in which the phase conversion shaft is rotated synchronously with and at the same speed as the spindles for performing an operation on a crankpin and a second mode in which the phase conversion shaft is rotated with a relative speed difference with respect to the spindles for indexing the crankpins;

a detection shaft coupling the two spindles driving motors to each other;

detecting means for detecting asynchronous rotation of the motor shafts; and means for halting the spindle driving motors upon detection of asynchronous rotation by the detection means.

14. The apparatus according to claim 13, wherein the detection shaft has an axis located parallel to the first and second axes.

15. The apparatus according to claim 14, wherein the detection shaft includes two separate parts and a clutch joining the separate parts, the clutch being constructed to slip when asynchronous rotation of said spindles occurs, said detecting means serving to detect slippage of the clutch so that the motors may be halted upon detection of slippage.

16. A crankshaft phase indexing method comprising:

controlling crank shaft phase indexing apparatus to have at least two modes of operation;

rotating a pair of spindles of the apparatus at the same speed, each spindle being driven with an individual motor, wherein the spindles are axially aligned with a first axis;

holding a crankshaft with a pair of chucks such that each chuck holds one end of the crankshaft, the chucks being axially aligned with a second axis, which is parallel to the first axis;

rotating the crankshaft about the second axis with a phase indexing motor to selectively axially align individual crankpins of the crankshaft with the first axis, wherein the crankshaft is rotatable independently of the rotation of the spindles;

revolving the crankshaft and the chucks about the selected crankpin, which is axially aligned with the first axis in the first mode of operation; and revolving the crankshaft about the second axis with the phase indexing motor in the second mode of operation.

17. The method according to claim 16, wherein in the first mode, the phase indexing motor and the two spindle driving motors are rotated synchronously.

18. The method according to claim 16, including:

holding and positioning the crankshaft at a predetermined index angle with respect to the chucks in the first mode.

19. The method according to claim 16, including:

rotating the phase indexing motor with the spindle motors stopped in the second mode.

20. The method according to claim 16, including changing at least one of the rotational speeds of the spindles and the phase indexing motor to create a relative speed difference between the two rotational speeds while the two spindle driving motors are rotating, in the second mode.

21. A crankshaft phase indexing method comprising:

controlling a crankshaft phase indexing apparatus to have at least two modes of operation;

rotating a pair of spindles of the apparatus at the same speed, each spindle being driven with an individual motor, wherein the spindles are axially aligned with a first axis;

holding a crankshaft with a pair of chucks such that each chuck holds one end of the crankshaft, the chucks being axially aligned with a second axis, which is parallel to the first axis;

rotating the crankshaft about the second axis with a phase indexing motor to selectively axially align individual crankpins of the crankshaft with the first axis;

revolving the crankshaft and the chucks about the selected crankpin, which is axially aligned with the first axis in the first mode of operation;

revolving the crankshaft about the second axis with the phase indexing motor in the second mode of operation; and detecting asynchronism between the spindles and stopping the spindles when asynchronism is detected.

* * * * *

UNITED STATES PATENT AND TRADEMARK OFFICE
CERTIFICATE OF CORRECTION

PATENT NO.   : 6,026,549
DATED        : February 22, 2000
INVENTOR(S)  : Kunio Makino et al.

It is certified that error appears in the above-identified patent and that said Letters Patent is hereby corrected as shown below:

<u>Title page,</u>
Item [73], Assignee: change "Nippon Toyama Corporation" to
-- Nippei Toyama Corporation --.

Signed and Sealed this

Eighteenth Day of March, 2003

JAMES E. ROGAN
*Director of the United States Patent and Trademark Office*